Jan. 31, 1939.  F. N. JACOB  2,145,483
CATHODE RAY OSCILLOSCOPE
Filed Nov. 12, 1934   3 Sheets-Sheet 1

INVENTOR,
FREDERICK N. JACOB,
BY Clemens H. Vig,
ATTORNEY.

Fig. 5.

INVENTOR,
FREDERICK N. JACOB,
BY Clemens H. Vig,
ATTORNEY.

Patented Jan. 31, 1939

2,145,483

UNITED STATES PATENT OFFICE 2,145,483

CATHODE RAY OSCILLOSCOPE

Frederick N. Jacob, Chicago, Ill., assignor to Johnson Laboratories, Inc., Chicago, Ill., a corporation of Illinois Application November 12, 1934, Serial No. 752,794

9 Claims. (Cl. 175—183)

This invention relates to an improved cathode-ray oscilloscope adapted to indicate the performance of a resonant system, and consists of the units and combinations herein described and claimed.

The use of a cathode-ray tube to indicate the magnitude, wave form, and phase relationships of voltages and currents is well known, and the apparatus required for thus utilizing the cathode-ray tube is familiar to those skilled in the art. Such arrangements are not suitable, however, for conveniently indicating the performance of a resonant system which is under test or adjustment.

An object of my invention is to provide a fast and accurate means for observing the performance of a resonant system while it is operating under normal conditions. A further object of my invention is to provide an accurate means for measuring the performance of a resonant system under definite conditions of operation. Still a further object of my invention is to provide a compact and reliable testing equipment for resonant systems, capable of being operated entirely from a single commercial power source of alternating current. Additional objects appear in the following specification, and the appended claims point out in particular the features of the present invention, which will be better understood by reading the specification in conjunction with the accompanying drawings, in which:

Figure 1:
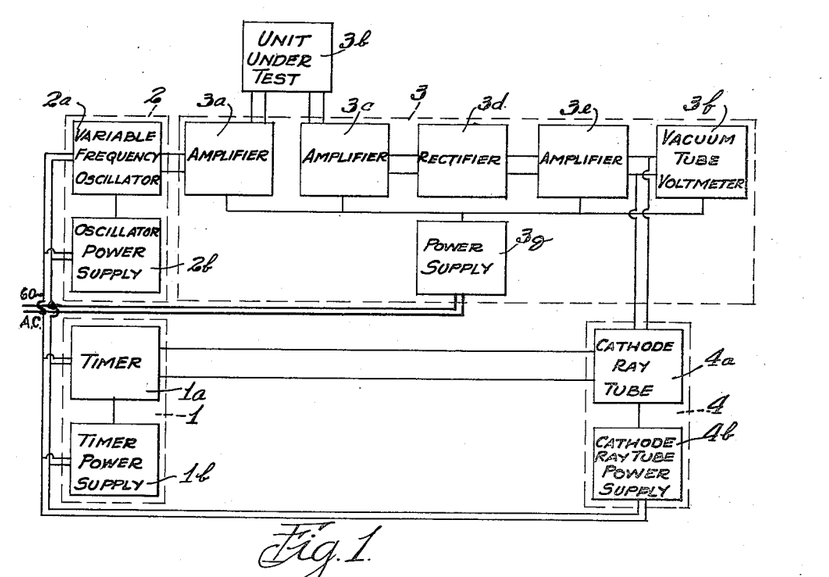
Figure 1 is a block diagram showing in outline form one embodiment of my cathode-ray oscilloscope for indicating the performance of a resonant system.

Referring to Figure 1, unit 1, which may be called the horizontal sweep circuit, includes a device 1a designed to produce a voltage which increases linearly with time for a definite interval, and then returns to zero during a very much shorter interval. This cycle is repeated a desired number of times per second, the timing being determined in a manner to be described later. When the output of the timer is connected to the horizontal deflecting plates of the cathode-ray tube 4a, the spot at which the beam of electrons strikes the fluorescent screen of the tube is given a cyclic motion on a horizontal line across the screen, the return sweep being very rapid. A power supply 1b for operating the timer 1a from the alternating-current supply line is included in this unit.

Unit 2, Figure 1, which may be called the vertical radio-frequency sweep circuit, includes a variable-frequency oscillator 2a having a substantially constant output amplitude. It is so designed that the output frequency varies at a definite rate over a limited band, the middle frequency of the band being predetermined by a suitable adjustment. Provision is made for maintaining the output at any frequency within the band if desired. Unit 2 contains a power supply 2b for operating the oscillator 2a from the alternating-current power line.

Means are provided, as will hereinafter be described, whereby the horizontal sweep circuit, the power supply, and also the vertical radio-frequency sweep circuit, can be synchronized, thus producing a stationary picture on the fluorescent screen of the cathode-ray tube. This synchronizing means also functions to eliminate power-supply ripple from the image on the screen of the cathode-ray tube, producing an excellent reproduction of the performance characteristics of the radio-frequency device under investigation.

Unit 3 in Figure 1 consists of several components. In the order in which the high-frequency signal from oscillator 2a passes through them, they are: an untuned stage of amplification 3a; the resonant system under test 3b; a broadly tuned stage of amplification 3c; a rectifier 3d; a direct-current amplifier 3e; and a vacuum-tube voltmeter 3f. In addition, there is provided a power supply 3g which furnishes all of the necessary operating potentials to the components of unit 3 from the alternating-current power line. The amplifier stage 3a is provided with a suitable attenuator for regulating the level of signal input to the resonant system being tested. The output circuit of amplifier stage 3a and the input circuit of amplifier 3c are so designed as to be equivalent to the source and load impedances, respectively, which are normally employed in conjunction with the type of resonant systems to be tested.

The rectifier 3d is of the substantially linear type so that its direct-current output is practically proportional to its high-frequency input. The rectifier output, after being amplified by the direct-current amplifier 3e, is supplied both to the vacuum-tube voltmeter 3f which is contained in unit 3 and to the vertical pair of deflecting plates of the cathode-ray tube 4a. Thus, the direct-current output of unit 3 causes the spot on the fluorescent screen to move in a vertical direction in accordance with its magnitude.

Unit 4, Figure 1, includes the cathode-ray tube 4a and its power supply 4b. The tube has four deflecting plates, arranged in two pairs of two parallel plates. The horizontal plates are connected to the output of the timer 1a in unit 1, and the vertical plates are connected to the output of the direct-current amplifier stage 3e in unit 3. The power supply 4b is connected to the alternating-current power line. Provision is made for centering the trace on the screen, which may be marked to indicate quantitative values or production limits or both. In operation, the resonance curve of the resonant system under test appears on the screen of the cathode-ray tube 4a.

Figure 2:
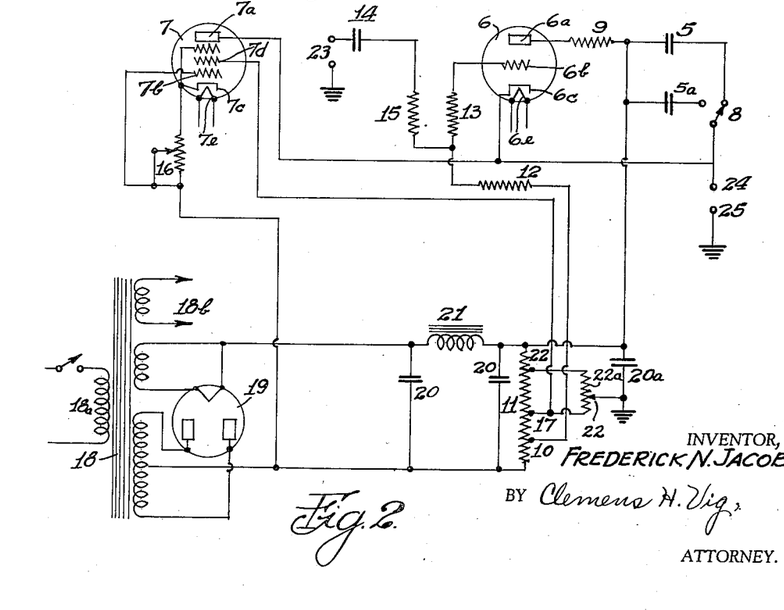
Figure 2 is a wiring diagram of a sweep circuit for the horizontal time axis of the cathode-ray oscilloscope of Figure 1, and its power supply.

Referring to Figure 2, the horizontal sweep circuit consists essentially of a condenser 5, shunted by gaseous-discharge tube 6, connected in series with constant-current device 7 across a source of high direct-current potential. By means of switch 8, condenser 5a may be substituted for condenser 5. A current-limiting resistor 9 is connected in series with the plate 6a of tube 6, and the common terminals of resistor 9 and condenser 5 are connected to the positive terminal of voltage divider 11. Condenser 20a provides a low-impedance path to ground. The grid 6b is maintained at a desired potential relative to the cathode 6c of tube 6 by means of a tap 10 on voltage divider 11, to which grid 6b is connected through series resistors 12 and 13. A synchronizing voltage may be applied to grid 6b by means of blocking condenser 14 and series resistor 15.

Constant-current device 7 is a pentode vacuum tube, the plate 7a of which is connected to the cathode 6c of tube 6. Cathode 7c of tube 7 is connected through an adjustable biasing resistor 16 to the negative terminal of voltage divider 11. Control-grid 7b is connected to the negative terminal of resistor 16. Screen-grid 7d is connected to a suitable tap 17 on voltage divider 11. Heaters 6e and 7e of tubes 6 and 7, respectively, are supplied with a suitable alternating-current voltage.

The source of high direct-current potential consists of multi-winding transformer 18, full-wave rectifier tube 19, filter condensers 20, and filter choke 21. Primary winding 18a is connected to the commercial power line. Secondary winding 18b supplies low-voltage alternating current to the heaters 6e and 7e of the tubes 6 and 7, respectively. The adjustable tap 22 on potentiometer 22a, which is in shunt with a portion of voltage divider 11, is grounded.

In operation, condenser 5 charges at a uniform rate because the charging current flows through constant-current device 7. When the voltage across condenser 5 reaches a certain value, ionization takes place in tube 6 and condenser 5 discharges quickly through tube 6, the discharge current being limited by resistor 9. When the voltage becomes less than the critical value, the discharge ceases and the condenser 5 begins to charge again. The time required to complete the cycle depends upon the value of condenser 5 and upon the control-grid bias on the tube 7. A rough adjustment may be made by means of switch 8, and a finer adjustment of the frequency is had by varying the value of biasing resistor 16. If an alternating-current voltage is applied to terminals 23 and the timer is adjusted to approximately the same frequency, the timer will automatically lock into step with the external source of voltage.

An inspection of the circuit arrangements will show that the potential of output terminal 24 relative to output terminal 25 is first negative, next decreasingly negative and then increasingly positive, the change occurring substantially linearly with time, finally returning quickly to its initial negative value. If the horizontal pair of deflecting plates of a cathode-ray tube are connected to terminals 24 and 25, the spot will be caused to move across the fluorescent screen linearly with time, returning during a very short interval to its starting point upon completing each excursion. The resultant line may be horizontally centered on the screen by adjusting tap 22 on potentiometer 22a, which determines the initial negative potential applied to terminal 24.

Figure 3:
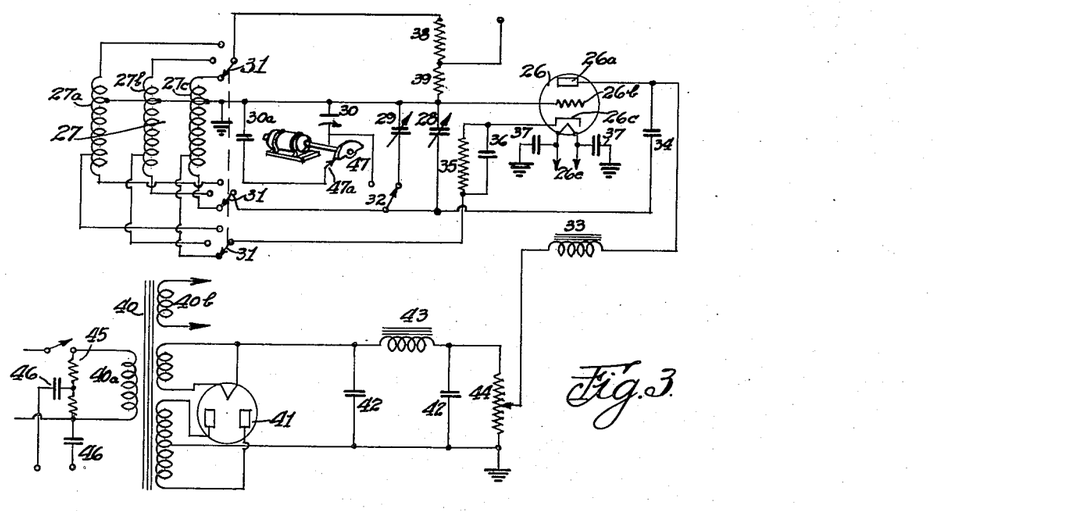
Figure 3 is a wiring diagram of the variable-frequency oscillator of Figure 1, which is suitable for supplying input energy to a resonant system under test, and its power supply.

Referring to Figure 3, the variable-frequency oscillator consists essentially of an oscillating vacuum tube 26, inductance 27 consisting of three tapped sections 27a, 27b, 27c, suitable tuning condensers 28, 29, 30, 30a, and a source of high-potential direct current. Ganged tap-switch 31 is provided for selecting the desired inductance section. Switch 32 permits either variable condenser 29 or rotating condenser 30 to be shunted across a portion of inductance 27. A high positive potential is applied to plate 26a of tube 26 by means of iron-core choke 33, and condenser 34 provides a high-frequency feedback path from plate 26a to inductance 27. Grid 26b of tube 26 is connected to the grounded tap of inductance 27. Cathode 26c of tube 26 is connected to inductance 27 through biasing resistor 35, which is shunted by by-pass condenser 36. Heater 26e is supplied from a suitable low-voltage alternating-current circuit, each side of which is by-passed to ground by a condenser 37. Resistors 38 and 39 in series are shunted across a portion of inductance 27, the output terminals of the oscillator being the terminals of resistor 39.

The high-voltage power supply consists of multi-winding transformer 40, full-wave rectifier tube 41, filter condensers 42, filter choke 43, and voltage divider 44. Primary winding 40a is connected to the commercial power line. Secondary winding 40b supplies low-voltage alternating current to the heater 26e of tube 26. A voltage divider 45 across primary winding 40a permits a small alternating-current voltage to be tapped off for synchronizing purposes by means of condensers 46. This voltage is applied to terminals 23 of timer 1a, thus forming a locking circuit by which the horizontal sweep circuit and the vertical radio-frequency sweep circuit are held in strictly synchronous relation. Timer 1a is usually so adjusted as to go through two complete cycles during one complete period of frequency variation due to rotating condenser 30.

The rotor of rotating condenser 30 is driven by a synchronous motor which is supplied from the commercial power line. The motor shaft also carries commutator 47, which is arranged to contact brush 47a during the portion of each revolution which corresponds with one complete change of the capacitance of rotating condenser 30, thereby completing the circuit which connects rotating condenser 30 and large detuning condenser 30a in parallel across a portion of inductance 27. When commuator 47 is in contact with brush 47a, the circuit is widely detuned by condenser 30a, so that there is substantially zero response from any connected resonant system.

It is essential that the rotating condenser be well designed mechanically and properly mounted with relation to the synchronous motor. The rotor of the condenser should be supported directly on the motor shaft with no bearings except those in the motor itself. The stator must be so mounted that its plates are strictly parallel to the revolving rotor plates. Any lack of parallelism will cause an irregular variation of the capacitance and consequently of the frequency, and the trace on the screen of the cathode-ray tube will be accordingly distorted.

A variable condenser of the straight-line-capacitance type may be used, but will not, of course, give a linear change in frequency with time. In designing the apparatus for production testing on a single fixed frequency, shaped plates may be used, of the so-called straight-line-frequency type, to give a strictly linear frequency change.

When the apparatus is designed for use over several different frequency bands, special auxiliary stator plates may be provided. The vertical radio-frequency sweep circuit of Fig. 3, for example, has provision for three different frequency bands, selected by switch 31. In this case, three auxiliary stator plates are provided. These plates are insulated from the main stator group, and are connected to switch points, and a switch arm is provided, ganged so that it operates with switch 31 of Figure 3. Each plate is shaped so that it will correct the capacitance variation of the condenser to produce strictly straight-line frequency variation for one of the desired frequency-bands.

It is also desirable to provide, in the design of the rotating condenser, an adjustment by which it may be physically synchronized, so that the rotor plates start to enter the stator plates at the proper point during the rotation. Ordinarily it will not be difficult to make this adjustment by loosening the set-screw which holds the rotor on the shaft of the synchronous motor, and rotating the rotor to the proper position, and tightening the set-screw. The adjustment, once made, is permanent.

A more elaborate method of providing for this adjustment, which may be desirable in some embodiments, is to make provision for rotating the stator on suitable journals, through a small arc, by means of a worm or pinion engaging with a gear segment on the stator. The rotor may then be approximately positioned and exact adjustment made by a knob on the worm or pinion shaft.

In use, the frequency band to be covered is determined roughly by means of tap-switch 31, a finer adjustment being made by means of condenser 28, which is preferably fitted with a calibrated dial. With switch 32 thrown to the right, a steady output is obtained, the frequency of which may be varied over a narrow band by adjusting condenser 29, which acts as a vernier condenser in shunt with main tuning condenser 28.

If switch 32 is thrown to the left and rotating condenser 30 started, an intermittent output is obtained, the frequency of which varies over a narrow band of frequencies. The width of this band is determined by adjustment of condensers 28 and 30. By proper co-ordination of these condensers, the width of the band over which the frequency is varied may be determined, maintaining any desired middle frequency of the band.

The wide usefulness and versatility of an oscillator of this design is readily apparent when it is pointed out that the output remains substantially constant in amplitude irrespective of the frequency or frequency band for which it is adjusted. If desired, an output of adjustable amplitude is readily attained by substituting a potentiometer for resistors 38 and 39, connecting the ungrounded output lead to the movable arm of the potentiometer.

Figure 4:
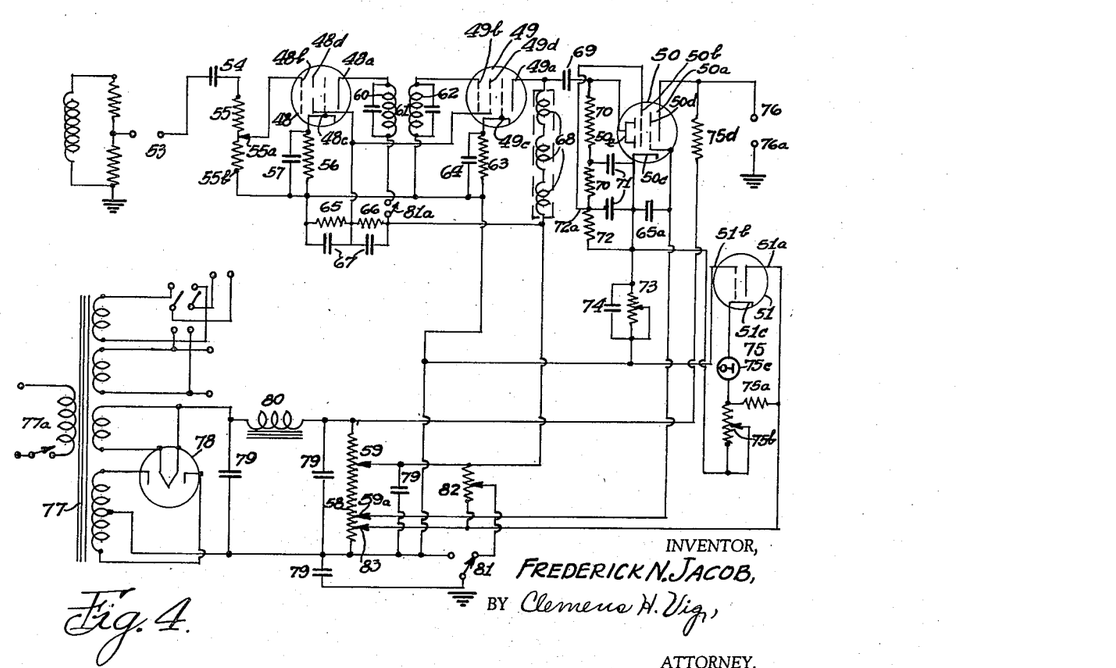
Figure 4 is a wiring diagram of the unit adapted to receive the resonant system under test in Figure 1, and includes input and output amplifiers, a rectifier and its output amplifier, a vacuum-tube voltmeter, and a suitable power supply.

Referring to Figure 4, this assembly consists essentially of two high-frequency amplifying stages including vacuum tubes 48 and 49, a rectifier and direct-current amplifier including vacuum tube 50, a thermionic voltmeter including vacuum tube 51, and a suitable source of high direct-current potential operating from the commercial alternating-current power line.

Input terminal 53 is connected through blocking condenser 54 to potentiometer 55, the movable arm 55a of which is connected to control-grid 48b of the tube 48. The low-potential terminal 55b of potentiometer 55 is connected through self-biasing resistor 56, which is shunted by by-pass condenser 57, to cathode 48c of tube 48. Potentiometer terminal 55b is also connected to the negative terminal of voltage divider 58. The connection from plate 48a of tube 48 to tap 59 on voltage divider 58 includes input circuit 60 of the resonant system 61 under test.

The connection to the control-grid 49b of tube 49 includes the output circuit 62 of the resonant system 61. Cathode 49c of the tube 49 is connected to the negative terminal of voltage divider 58 through self-biasing resistor 63, which is shunted by by-pass condenser 64. Resistors 65 and 66, each shunted by a condenser 67, are connected in series between the negative terminal of voltage divider 58 and tap 59 to provide a filtered potential of proper value for screen-grids 48d and 49d, of tubes 48 and 49, respectively. The plate 49a of tube 49 is connected through choke coils 68 to tap 59 on voltage divider 58.

It may occur in some instances that the choke coil 68, which is effectively in series with the interelectrode capacitance of tube 49 across the secondary of resonant system 62, will produce distortion of the resonance characteristic as indicated on the screen of the cathode-ray tube. In such a case, the choke 68 may be replaced by a pure resistance, and an additional stage of resistance-coupled amplification may be added if necessary.

Plate 49a is also connected to diode plate 50e of tube 50 by means of blocking condenser 69. Diode plate 50e is connected to diode load resistor 72 through a high-pass filter consisting of series resistors 70 and shunt condensers 71. Control-grid 50b is connected to high-potential terminal 72a of diode load resistor 72. Thermionic voltmeter 75 is arranged to measure the potential drop across resistor 73, which is in series with cathode 50c of tube 50. Resistor 73 is shunted by by-pass condenser 74. Grid 51b of tube 51 is connected to the negative terminal of voltage divider 58. Plate 51a is connected to tap 83 on voltage divider 58. Plate load resistor 75a and milliammeter 75c are connected in series between cathode 51c and plate 51a. The common terminal of meter 75c and resistor 75a is connected through adjustable resistor 75b to cathode 50c of tube 50. Load resistor 75d is connected between plate 50a of tube 50 and the positive terminal of voltage divider 58. Output terminal 76 is connected to plate 50a of tube 50. Screen-grid 50d is connected to tap 59a on voltage divider 58, and is by-passed to cathode 50c by condenser 65a.

The power supply consists of multi-winding transformer 77 having a primary winding 77a adapted for connection to the commercial power line, a full-wave vacuum-tube rectifier 78, filter condensers 79, and filter choke 80. If switch 81 is thrown to the left, the negative terminal of voltage divider 58 is grounded. If thrown to the right, the movable arm of potentiometer 82 is grounded. Potentiometer 82 is connected between taps 59 and 83 on voltage divider 58. Switch 81a opens the high-potential supply to the system 61 and places it at substantially ground potential. Switches 81 and 81a are ganged together and serve to protect the operator from shock.

In operation, a high-frequency voltage of fixed or varying frequency, as for instance the output of the variable-frequency oscillator shown in Figure 3, is applied between input terminal 53 and ground. The unit to be tested may be any resonant system. In Figure 4, an intermediate-frequency transformer is shown, at 61, but this is merely by way of example and is not intended as a limitation on the usefulness of the invention. It is to be noted that resonant system 61 looks back into the plate impedance of a standard high-frequency amplifying vacuum tube 48 and forward into the control-grid impedance of a standard high-frequency amplifying vacuum tube 49, each tube operating under conditions such as are normally encountered in the type of apparatus with which the resonant system under test is designed to operate.

The amplified high-frequency signal is rectified by the diode portion of tube 50, the resultant direct-current voltage appearing across diode load resistor 72, terminal 72a being negative with respect to cathode 50c. As the voltage across resistor 72 increases, the control grid 50b of the pentode portion of tube 50 becomes increasingly negative with respect to cathode 50c, which in turn produces a decrease in the plate current of tube 50. Hence the drops in potential across resistors 75d and 73 decrease, changing the potential of output terminal 76 with respect to ground and the grid-bias voltage on tube 51, respectively.

With no input applied to terminal 53, rheostat 75b is adjusted so that meter 75c reads zero. If an input of fixed frequency is applied to terminal 53, an indication of the response of resonant system 61 to that frequency is obtained from the reading of meter 75c.

Figure 5:
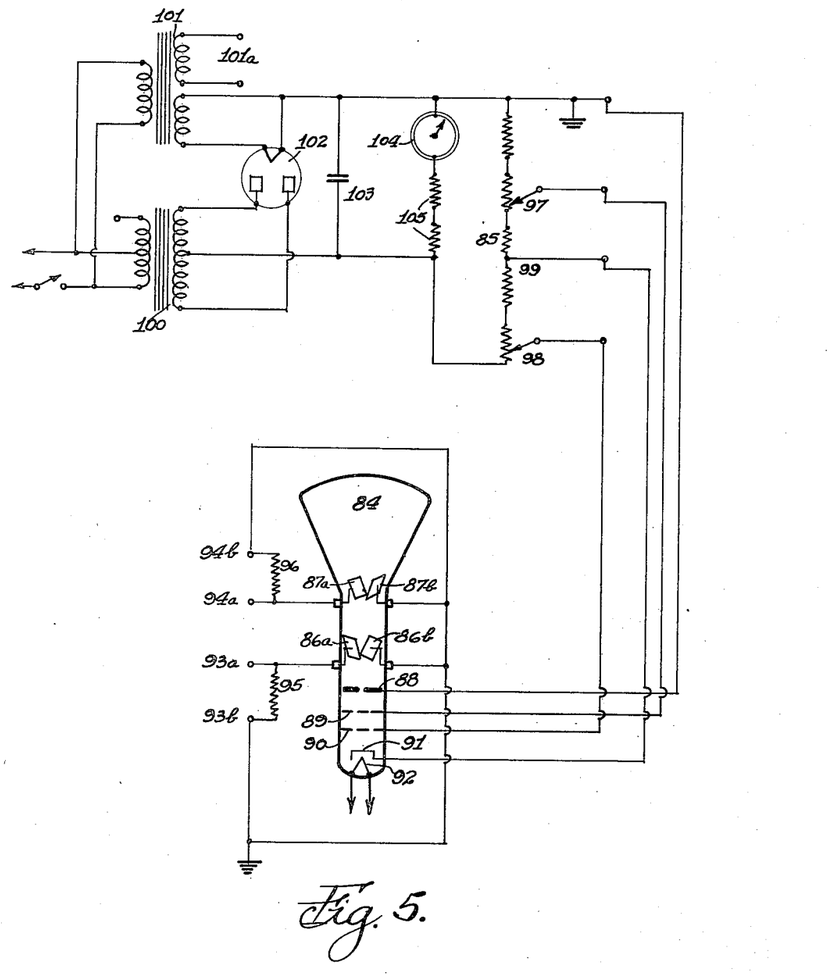
Figure 5 is a wiring diagram of the cathode-ray tube shown in Figure 1, and its power supply.

Referring to Figure 5, the cathode-ray tube unit consists essentially of a cathode-ray tube 84 and a source of high-potential direct current. Tube 84 includes horizontal deflecting plates 86a and 86b, vertical deflecting plates 87a and 87b, anode 88, screen-grid 89, control-grid 90, cathode 91, and heater 92. Plates 86a and 86b are connected to terminals 93a and 93b, respectively. Plates 87a and 87b are connected respectively to terminals 94a and 94b. Resistors 95 and 96, which are respectively shunted across the horizontal and the vertical deflecting plates, prevent direct-current potentials from building up across the plates.

Anode 88 is connected to the positive terminal of voltage divider 85. Screen-grid 89 is connected to adjustable tap 97 on voltage divider 85. Control-grid 90 is connected to adjustable tap 98 on voltage divider 85. Cathode 91 is connected to a tap 99 located between taps 97 and 98 on voltage divider 85. Heater 92 is supplied with alternating current from a suitable low-potential source.

The high-potential power supply consists of plate transformer 100 and filament transformer 101, each of which has a primary winding connected to the commercial alternating-current power line; full-wave rectifier tube 102; filter condenser 103; output potential measuring means including milliammeter 104 and series resistors 105; and voltage divider 85, the positive terminal of which is grounded. Secondary winding 101a of filament transformer 101 supplies a suitable low-potential current for heater 92 of tube 84.

In operation, focus of the electron beam is adjusted by means of tap 97 supplying screen-grid 89. The beam current, which determines the brightness of the spot on the screen, is regulated by adjusting the voltage applied to control-grid 90, the adjustment being accomplished by means of adjustable tap 98.

Terminals 93a and 93b are connected to terminals 24 and 25, respectively, of the timer shown in Figure 2. Terminals 94a and 94b are connected respectively to terminals 76 and 76a of the amplifier-rectifier unit shown in Figure 4.

With the whole system connected as shown diagrammatically in Figure 1 in operation, the trace on the fluorescent screen may be centered horizontally by means of adjustable tap 22 on potentiometer 22a in Figure 2. Vertical centering may be obtained by adjustment of potentiometer 82 in Figure 4, switch 81 being in the right-hand position. The vertical magnitude of the trace may be adjusted by changing the position of arm 55a on gain-control potentiometer 55 in Figure 4. One purpose of the commutator 47 and brush 47a in Figure 3 is to permit only one trace to appear on the screen. If two traces are desired, this commutator and brush may be open-circuited. An additional advantage of the arrangement shown, moreover, is that the spot reinforces the trace of the zero line on the screen, so that the amplitude of the response characteristic may be accurately adjusted and read. This is an unique feature of the apparatus.

The resonant system under test, 61, is tuned to resonance manually, and at resonance, maximum deflection of meter 75c will be noted. After manual adjustment, the switch 32 is thrown from its right-hand to its left-hand position, and it is then possible to observe on the fluorescent screen of the cathode-ray tube the complete frequency characteristic of the resonant system. If the system has a coupling adjustment, it will be possible by varying the coupling to change the shape of the curve from a very sharply peaked curve through intermediate shapes to a condition of extreme overcoupling, when the curve will have two distinct peaks. The fluorescent screen of the cathode-ray oscilloscope can be divided off with a series of vertical and horizontal lines, the vertical lines representing band width in kilocycles, and the horizontal lines representing amplitude or gain.

The present invention, although especially adapted for the testing and adjusting of intermediate-frequency transformers for use in superheterodyne radio receivers, may with equal success be employed for the testing and adjustment of other resonant systems, as for instance bandpass filters or complete radio receivers. The limited life of present-day cathode-ray tubes makes it desirable to reduce the amount of time during which they are in operation. The vacuum-tube voltmeter, which is included in the described embodiment of the present invention, permits all preliminary adjustments to be made without the use of the cathode-ray tube, resulting in a distinct saving in the cost of operation over a period of time during which a number of different types of tests are made with the apparatus.

For convenience in describing the invention, the chosen embodiment has been illustrated as having four separate units, each with its own power-supply equipment. Such an arrangement will be found particularly advantageous in building the equipment for production testing purposes. Each unit will then be built upon its own chassis, completely wired, supplied with suitable terminals and leads for connections to other units, and with its own alternating-current supply cord to be plugged into a 60-cycle source of potential. The four units are conveniently arranged to be mounted upon a standard telephone relay rack, which will have a box with four convenient outlets into which the units may be plugged. The relay rack with its assembled apparatus may then be placed at the end of the production table, in position of use. The advantage of the separate units lies in the fact that spare units may be provided, and can be conveniently and quickly substituted for any one of the four units which becomes temporarily inoperative, or requires adjustment or calibration.

Alternatively, the apparatus may be simplified by utilizing one power supply unit for the high-voltage supply of the cathode-ray tube, and one power supply unit for all the remaining units. In this way the apparatus may be designed in very compact form and mounted in a suitable carrying case for portable use, for example in demonstrations, and in service work. It is to be understood that I have described the more elaborate design adapted for continuous use in production testing, but that any arrangement of the apparatus to adapt it to the intended use lies within the purview of my invention.

It will be seen that my invention provides an operative and conveniently controllable apparatus for the particular purpose, as stated at the outset, of providing means whereby the resonance curve of a resonant system may be made continuously visible for as long a time as may be required to determine that the system is in satisfactory condition, or to make any needful adjustments. This utility, so far as I am aware, has not been provided by any previously disclosed apparatus or device.

Having thus described my invention, what I claim is:

1. An apparatus for visually indicating the frequency response characteristic of a resonant high-frequency electrical system, said apparatus being connected to a standard low-frequency power source and including in combination a vacuum tube having an electron beam and plates for deflecting said beam in vertical and horizontal directions; a voltage source having relatively slow and substantially linear change in voltage in one direction and relatively rapid change in the opposite direction, said voltage source being actuated from said power source and connected to said horizontal deflecting plates; a generator of high frequencies of the order of the characteristic frequency of said resonant system, but varying periodically between limits synchronously with said standard low frequency; a first amplifier connected to said generator and to the output of which said resonant system is connected; a second amplifier connected to the output of said resonant system; a substantially linear rectifier for producing a uni-directional potential proportional to the output of said second amplifier; connections for applying said uni-directional potential to said vertical deflecting plates; and a device operatively associated with the frequency-varying means of said generator for suppressing the voltage from said generator during alternate half-period variations of its frequency.

2. An apparatus for rendering continuously visible the complete frequency response characteristic of a resonant high-frequency system, said apparatus being connected to a standard low-frequency power source and including in combination a cathode-ray tube having vertical and horizontal deflecting plates; a voltage source having relatively slow and substantially linear change in voltage in one direction and relatively rapid change in the opposite direction, said voltage source being connected to said horizontal deflecting plates; a generator of high frequencies of the order of the characteristic frequency of said resonant system, said generator having means whereby its frequency is varied within limits synchronously with said standard frequency; a first amplifier connected to said generator and to the output of which said resonant system is connected; a second amplifier connected to the output of said resonant system; a substantially linear rectifier for producing a uni-directional potential proportional to the output of said second amplifier; connections for applying said uni-directional potential to said vertical deflecting plates; and a device operatively associated with said means for optionally suppressing the voltage from said generator during alternate half-period variations of its frequency.

3. An apparatus connected to a standard low-frequency power source and including in combination a device for continuously indicating the resultant of two varying voltages; a first voltage source having relatively slow and substantially linear change in one direction and relatively rapid change in the opposite direction; a generator of alternating energy periodically varying in frequency; a first amplifier connected to said generator having output terminals to which an external high-frequency resonant system is connected; a second amplifier connected to the output of said resonant system; a substantially linear rectifier for producing a second voltage proportional to the output of said second amplifier; connections for applying said two voltages to said device; a device operatively associated with said generator for optionally suppressing the voltage from said generator during alternate half-period variations of its frequency; and means for synchronizing said two voltages; whereby the performance of said resonant system may be visually indicated.

4. An apparatus for performance observations on a resonant electrical system connected to a low-frequency power source and including in combination a vacuum tube having an electron beam and vertical and horizontal deflecting plates and a fluorescent screen upon which said beam is focused; a voltage source having relatively slow and substantially linear change in voltage in one direction and relatively rapid change in the opposite direction, said voltage source being actuated from said power source and connected to said horizontal deflecting plates; a generator of high frequencies of the order of the characteristic frequency of said resonant system, said generator including a variable condenser driven by a synchronous motor connected to said power source, whereby the frequency of said generator is varied periodically within limits synchronously with said standard frequency; a first amplifier to the output of which said resonant system is connected and to which the output of said generator is fed; a second amplifier connected to the output of said resonant system; a substantially linear rectifier for producing a uni-directional potential proportional to the output of said second amplifier; connections for applying said uni-directional potential to said vertical deflecting plates; and a contact-making mechanism associated with said synchronous motor for optionally suppressing the voltage from said generator during alternate half-period variations of its frequency; whereby said beam is caused to make upon said screen a continuously visible trace of the frequency response characteristic of said resonant electrical system.

5. An apparatus including as component units a device for continuously indicating the resultant of two varying voltages, an electronically controlled voltage source producing relatively slow and substantially linear change in voltage in one direction and relatively rapid change in the opposite direction, said voltage source including an electrically controlled gaseous discharge tube, a generator of alternating energy periodically varying in frequency, a first amplifier connected to said generator and having terminals to which an external high-frequency resonant system is connected, a second amplifier connected to the output of said resonant system, a substantially linear rectifier for producing a second voltage proportional to the output of said second amplifier, and means including a connection between the control circuit of said voltage source and the power-supply source of said generator for synchronizing said two voltages, whereby the performance of any connected resonant system may be visually indicated.

6. An apparatus including a multi-element vacuum tube for continuously indicating the resultant of two voltages, a first voltage source producing a non-sinusoidal alternating voltage, a generator of alternating energy of periodically varying frequency, an amplifier, a rectifier for producing a voltage proportional to the output of said amplifier, means operatively linking said generator and said first voltage source for synchronizing said two voltages, and means for suppressing the output of said generator while its frequency is decreasing.

7. An apparatus including as component units a cathode-ray tube having vertical and horizontal deflecting plates, a source of non-sinusoidal alternating voltage connected to said horizontal deflecting plates, a generator of alternating energy periodically varying in frequency, an amplifier, a rectifier connected to the output of said amplifier, means for optionally suppressing the voltage from said generator during alternate half-period variations of its frequency, and sources of the necessary operating voltages for each of said component units.

8. An apparatus including as component units a cathode-ray tube having vertical and horizontal deflecting plates; a voltage source having relatively slow and substantially linear change in voltage in one direction and relatively rapid change in the opposite direction, said voltage source being connected to said horizontal deflecting plates; a generator of alternating energy periodically varying in frequency; a first amplifier connected to said generator and having output terminals to which an external high-frequency resonant system is connected; a second amplifier connected to the output of said resonant system; a substantially linear rectifier for producing a uni-directional potential connected to the output of said second amplifier; a device operatively associated with said generator for optionally suppressing the voltage from said generator during alternate half-period variations of its frequency; and sources of the necessary operating voltages for each of said component units and appropriate connections between said components; whereby the performance of said resonant system may be visually indicated.

9. An apparatus for performance observations on a resonant electrical system, said apparatus being connected to a standard low-frequency power source and including in combination a cathode-ray tube having vertical and horizontal deflecting plates; a voltage source having relatively slow and substantially linear change in voltage in one direction and relatively rapid change in the opposite direction, said voltage source being connected to said horizontal deflecting plates; a generator of high frequencies of the order of the characteristic frequency of said resonant system, but varying periodically between limits; a first amplifier connected to said generator and to the output of which said resonant system is connected; a second amplifier connected to the output of said resonant system; a substantially linear rectifier for producing a uni-directional potential proportional to the output of said second amplifier and connected thereto; connections for applying said uni-directional potential to said vertical deflecting plates; a device operatively associated with said generator for optionally suppressing the voltage from said generator during alternate half-period variations of its frequency and means for synchronizing the output of said voltage source with the output from said generator.

FREDERICK N. JACOB.

CERTIFICATE OF CORRECTION.

Patent No. 2,145,483. January 31, 1939.

FREDERICK N. JACOB.

It is hereby certified that error appears in the printed specification of the above numbered patent requiring correction as follows: Page 3, first column, line 4, for "commuator" read commutator; line 41, for "frequency-bands" read frequency bands; page 4, first column, line 46, for "control grid" read control-grid; page 5, first column, line 24-25, for "convenient" read convenience; and second column, line 11, claim 1, after "for" insert optionally; line 51, claim 3, before "having" insert and; page 6, second column, line 57, claim 9, after the syllable "quency" insert a semicolon; and that the said Letters Patent should be read with this correction therein that the same may conform to the record of the case in the Patent Office.

Signed and sealed this 11th day of April, A. D. 1939.

(Seal)

Henry Van Arsdale
Acting Commissioner of Patents.

CERTIFICATE OF CORRECTION.

Patent No. 2,145,483. January 31, 1939.

FREDERICK N. JACOB.

It is hereby certified that error appears in the printed specification of the above numbered patent requiring correction as follows: Page 3, first column, line 4, for "commuator" read commutator; line 41, for "frequency-bands" read frequency bands; page 4, first column, line 46, for "control grid" read control-grid; page 5, first column, line 24-25, for "convenient" read convenience; and second column, line 11, claim 1, after "for" insert optionally; line 51, claim 3, before "having" insert and; page 6, second column, line 57, claim 9, after the syllable "quency" insert a semicolon; and that the said Letters Patent should be read with this correction therein that the same may conform to the record of the case in the Patent Office.

Signed and sealed this 11th day of April, A. D. 1939.

(Seal)

Henry Van Arsdale
Acting Commissioner of Patents.